US008593290B2

(12) United States Patent
Hunter et al.

(10) Patent No.: US 8,593,290 B2
(45) Date of Patent: Nov. 26, 2013

(54) OVERFILL DETECTION SYSTEM FOR TANK TRUCKS

(75) Inventors: Jeffrey K. Hunter, Blue Springs, MO (US); Kevin K. Nussair, Independence, MO (US); Randy Donald Robinson, Bates City, MO (US); Mark William Dudley, Smithville, MO (US); Amber Smith, Shawnee, KS (US)

(73) Assignee: Delaware Capital Formation, Inc., Wilmington, DE (US)

( * ) Notice: Subject to any disclaimer, the term of this patent is extended or adjusted under 35 U.S.C. 154(b) by 738 days.

(21) Appl. No.: 12/775,327

(22) Filed: May 6, 2010

(65) Prior Publication Data

US 2010/0289654 A1    Nov. 18, 2010

Related U.S. Application Data

(60) Provisional application No. 61/177,810, filed on May 13, 2009.

(51) Int. Cl.
| G08B 21/00 | (2006.01) |
| H01R 13/73 | (2006.01) |
| H01R 13/62 | (2006.01) |
| H01R 13/56 | (2006.01) |
| H01R 9/00  | (2006.01) |
| H05K 1/14  | (2006.01) |
| H01B 7/04  | (2006.01) |

(52) U.S. Cl.
USPC .......... 340/620; 340/618; 340/626; 340/603; 340/604; 340/622; 439/557; 439/329; 439/448; 361/776; 361/789

(58) Field of Classification Search
USPC .......... 340/616, 620; 439/557, 329; 361/776, 361/789; 367/140–191
See application file for complete search history.

(56) References Cited

U.S. PATENT DOCUMENTS

| 4,345,146 A   | 8/1982 | Story et al. |
| 4,469,149 A   | 9/1984 | Walkey |
| 4,572,254 A   | 2/1986 | Maeshiba |
| 5,096,158 A * | 3/1992 | Burdick et al. ............... 251/144 |
| 5,209,275 A   | 5/1993 | Akiba et al. |

(Continued)

OTHER PUBLICATIONS

Dixon Valve and Coupling Company; retrieved on May 6, 2012 from http://dixoneurope.co.uk/media/product_pdfs/369381.pdf pertinent pages: all.*

(Continued)

*Primary Examiner* — Daniel Wu
*Assistant Examiner* — Muhammad Adnan
(74) *Attorney, Agent, or Firm* — Erickson Kernell Derusseau & Kleypas, LLC

(57) ABSTRACT

An overfill probe is utilized in each compartment of a multi-compartment transport tanker and has a depending sensing tube for detecting liquid overfill conditions. An overfill detector is within the bottom end of the probe tube and is thus protected from damage. Internal damage to the probe and malfunction of the system also precluded by connecting the exposed cap of the probe to the detector by a longitudinally extensible, stretchable cable extending through the tube to the detector, or a circuit board may be retained within the depending tube. Additionally, a thermistor socket and an optic socket are provided which are part of the overfill protection system, each having contact connections that may be readily replaced when worn without removing or replacing the wiring within the socket assembly.

10 Claims, 11 Drawing Sheets

(56) References Cited

U.S. PATENT DOCUMENTS

| | | | |
|---|---|---|---|
| 5,438,323 A * | 8/1995 | Shea | 340/620 |
| 5,507,326 A * | 4/1996 | Cadman et al. | 141/198 |
| 5,515,890 A | 5/1996 | Koeninger | |
| 5,534,708 A * | 7/1996 | Ellinger et al. | 250/577 |
| 5,605,182 A | 2/1997 | Oberrecht et al. | |
| 5,975,160 A | 11/1999 | Rush | |
| 6,032,703 A | 3/2000 | Baker et al. | |
| 6,047,250 A | 4/2000 | Beaudoin et al. | |
| 6,085,805 A | 7/2000 | Bates | |
| 6,218,949 B1 * | 4/2001 | Issachar | 340/624 |
| 6,363,299 B1 | 3/2002 | Hartsell, Jr. | |
| 6,365,908 B1 * | 4/2002 | Waigel et al. | 250/574 |
| 6,824,423 B1 | 11/2004 | Fahl | |
| 7,012,536 B2 | 3/2006 | McConnel et al. | |
| 7,188,771 B2 | 3/2007 | Poulter | |
| 7,424,928 B2 * | 9/2008 | Cox et al. | 181/111 |
| 7,940,165 B1 * | 5/2011 | Oxley et al. | 340/450.2 |
| 2002/0185619 A1 * | 12/2002 | Benton | 250/577 |
| 2004/0085200 A1 * | 5/2004 | McConnel et al. | 340/450.2 |
| 2004/0260470 A1 | 12/2004 | Rast | |
| 2005/0139286 A1 | 6/2005 | Poulter et al. | |

OTHER PUBLICATIONS

Title: Opti-Link Overfill Detection System; Publisher: www.civacon.com; pertinent pages: entire document; Date: Feb. 27, 2012; captured at Jul. 1, 2013.*

* cited by examiner

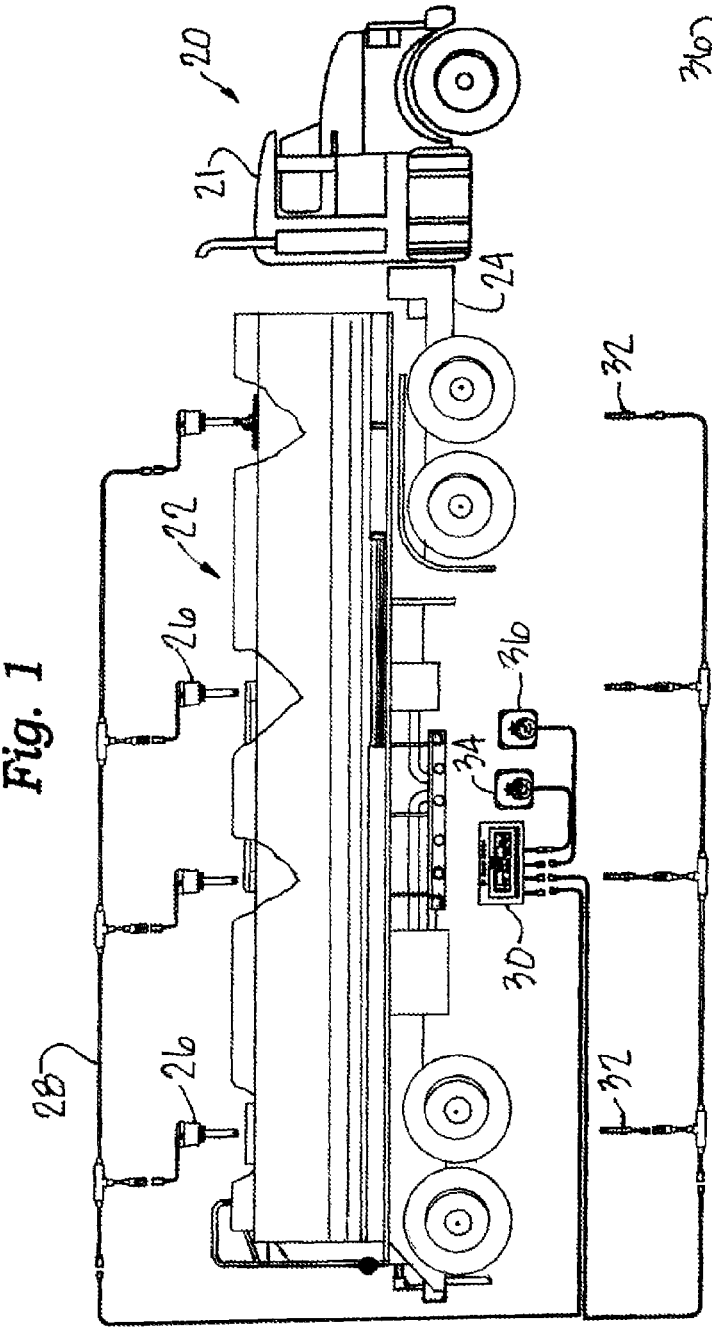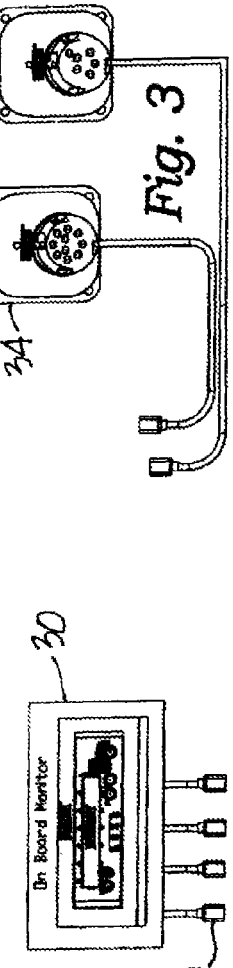

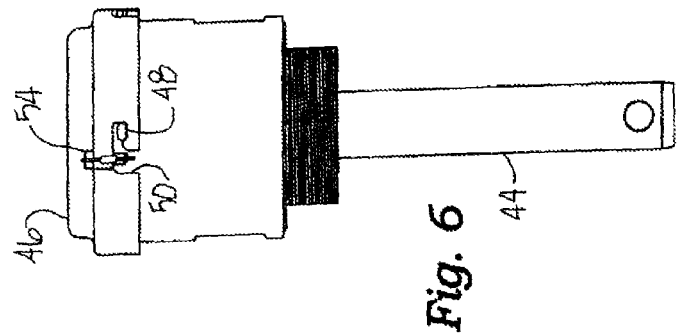
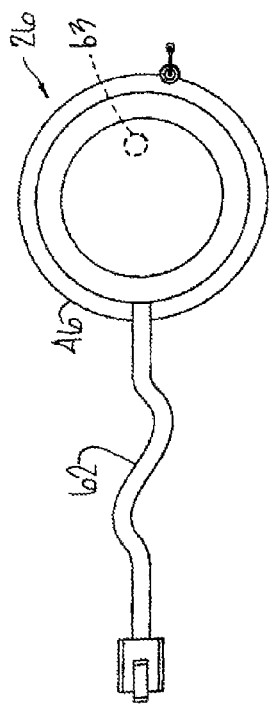
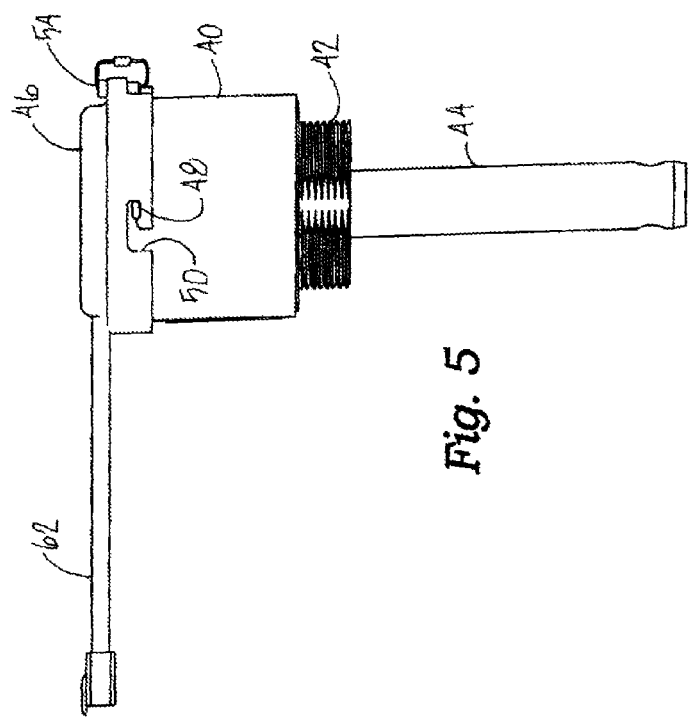

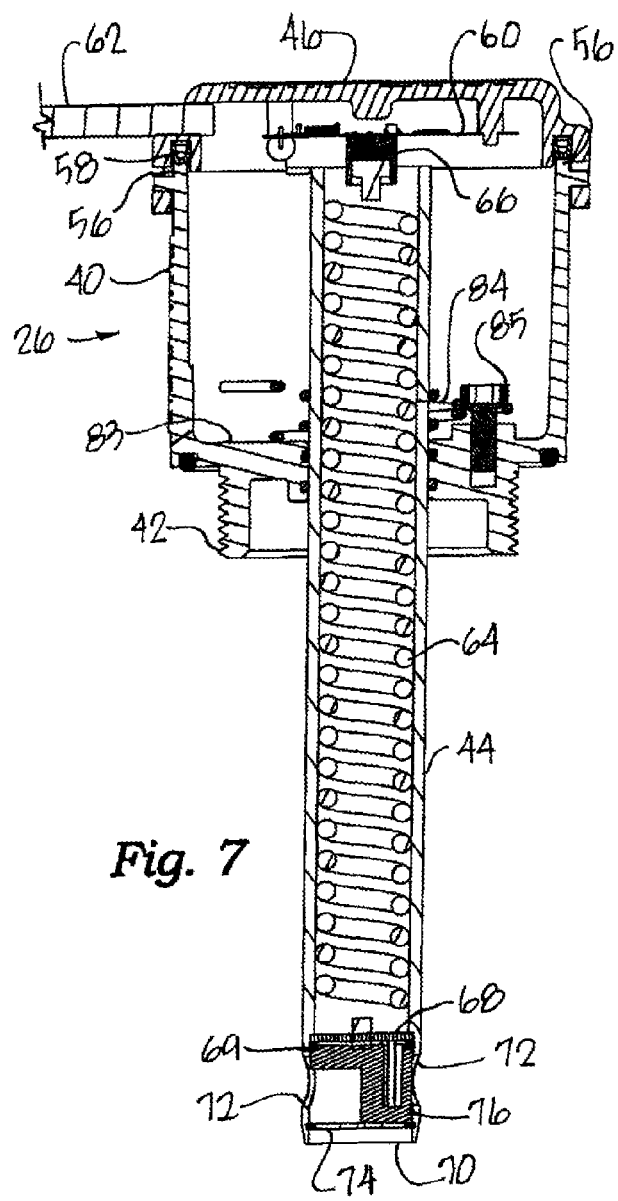
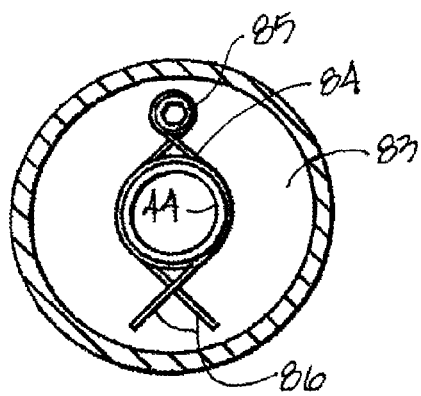
Fig. 8
Fig. 7

OVERFILL DETECTION SYSTEM FOR TANK TRUCKS

CROSS REFERENCE TO RELATED APPLICATION

This application claims the benefit of a prior filed, provisional application Ser. No. 61/177,810, filed May 13, 2009, entitled OVERFILL DETECTION SYSTEM FOR TANK TRUCKS.

FIELD OF THE INVENTION

This invention relates to improvements in the delivery systems for tank trucks that transport and deliver petroleum fuels to storage tanks which are typically underground, and may be located at filling stations or at other sites where vehicles are refueled and serviced.

BACKGROUND OF THE INVENTION

The loading and off-loading of petroleum products into the compartments of transport trucks, and from such compartments into storage tanks are common procedures well-known in the art. The separate compartments of a typical tank truck will often contain different fuels such as various grades of gasoline, diesel, fuel oils and kerosene. When loading these compartments with fuel, visual inspection is typically not possible and thus overfill sensors are installed in the respective tanks to provide signal feedback to shut down the delivery pumps when loading is complete. An example of such a delivery system is, for example, set forth in United States Patent Application Publication 2005/0139286 where a modular multi-port manifold and fuel delivery system is disclosed having a plurality of ports in fluid communication with corresponding compartments of the fuel delivery vehicle.

There are, however, limitations in such fuel delivery systems as they may be readily compromised and thus operate in less than an optimal manner. Since the tanks of transport trucks usually cannot be visually inspected while filling, overfill sensors are utilized to provide signal feedback to shut down the loading pumps when the appropriate level is reached. These typically comprise a probe that extends downwardly from the top of the tank compartment and, if properly operational, will sense the presence of the fuel when it rises to a sensor on the bottom end of the probe. However if the probe is non-functional for any reason, such as mishandling by operating personnel or component failure, or if the length of the probe tube that carries a sensor that detects the presence of the fuel is not properly matched to the compartment in which it is installed, the compartment may be either underloaded or overfilled. This can occur, for example, when a defective probe is replaced after a repair and a probe of improper length is installed. Also, improper signal wiring during installation of a system also adds to poor reliability, resulting in frustrated end users.

An overfill detection probe in common use comprises an optical detector and an electronic circuit board which communicates with the detector and also interfaces with other electronics of the system. However, the detector projects from the bottom end of the probe and is thus exposed to damage and malfunction if not carefully handled and installed. Also, the circuit board and associated wiring connections in the probe may be damaged due to mishandling and render the probe inoperable. Any such failure of an electrical element of the system may require the end user to recertify system integrity.

SUMMARY OF THE INVENTION

An overfill probe of the present invention is utilized in multi-compartment transport tankers and similar fuel loading applications. A probe having a depending sensing tube is provide for each compartment for detecting liquid overfill conditions. The overfill detector is within the probe tube and is thus protected from damage. Furthermore, in one aspect of the present invention the overfill probe has an exposed cap which, when removed, remains connected to the sensor by a longitudinally extensible, stretchable cable extending through the probe housing and the depending tube to the emitter and detector of the level sensor, thereby precluding internal damage to the probe and malfunction of the system if operating personnel improperly remove and withdraw the cap. A circuit board may be mounted in the cap and connected to the wiring of the electrical system.

In another aspect of the present invention, a circuit board may be retained within the depending tube.

In a further aspect of the present invention, a thermistor socket and an optic socket are provided which are part of the overfill protection system, each of which receives a plug secured to a cable extending from a control monitor at a loading island. Each socket has front contact pins and J-slots on the outside of the body of the socket that may be readily replaced when worn without removing or replacing the wiring within the socket assembly.

Other advantages of this invention will become apparent from the following description taken in connection with the accompanying drawings, wherein is set forth by way of illustration and example, embodiments of the present invention.

BRIEF DESCRIPTION OF THE DRAWINGS

FIG. 1 is a side view of a tank truck showing four overfill probes of the present invention removed from their respective compartments for illustrative purposes, bottom retain sensors being also removed from their respective compartments for illustration, and an on-board monitor and associated sockets connected thereto.

FIG. 2 is an enlarged illustration of the on-board monitor panel.

FIG. 3 is an enlarged view of the sockets that connect to the on-board monitor.

FIG. 4 is a plan view of an overfill probe of the present invention.

FIG. 5 is an elevational view of the probe of FIG. 4.

FIG. 6 is an elevational view of the probe of FIG. 4 as seen from the right side of the illustration of FIG. 5.

FIG. 7 is an enlarged, vertical cross-sectional view of the probe of FIG. 5 showing the internal components thereof.

FIG. 8 is a detail view of a retainer clip that secures the depending tube within the probe housing at a desired vertical position.

DETAILED DESCRIPTION

Figure 9:
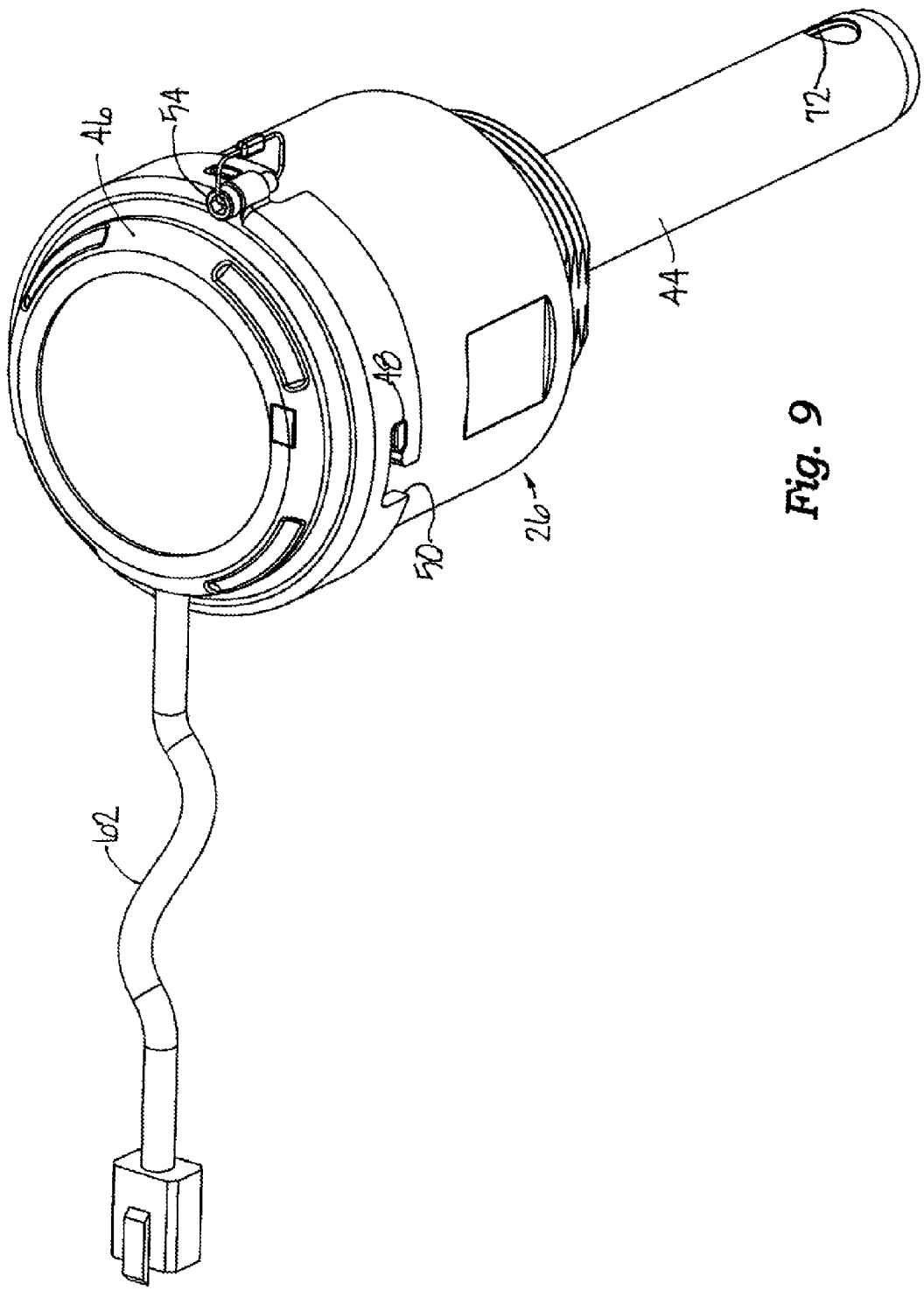
FIG. 9 is a perspective view of the probe of FIGS. 4, 5 and 6.

Referring initially to FIG. 1, a typical tank truck 20 for delivery of petroleum fuels has a compartmental tank 22 carried by the frame 24 of a trailer and, in the illustrated embodiment, is divided into multiple, separate compartments and thus may transport different types of fuel such as, for example, diesel fuel and gasoline of three different grades. FIG. 1 shows a typical four-compartment tank truck for reference. Each of the compartments is provided with an overfill probe 26, each of which, for illustrative purposes, is shown above the compartment with which it is associated. An electrical cable 28 connects the probes 26 to an on-board monitor 30 (FIGS. 1 and 2) which is located on the side of the tank 22 seen in FIG. 1. Cable 28 terminates at a connector 28' at the monitor 30 (FIG. 2).

The overfill probe 26 of each compartment provides a signal input to the monitor when the compartment is "empty," i.e., the fuel level is below the probe. An output signal, referred to as a "permit signal," is generated at a loading station (not shown) and the compartment may then be loaded to a maximum level sensed by the probe. As is conventional, the monitor terminates the permit signal when the level of fuel in the compartment reaches the overfill probe 26 and the signal from the overfill probe ceases. A system may or may not employ an on-board monitor, and operate only with probes and sockets and a responsive fuel delivery control.

Also, as is conventional, each of the compartments of tank 22 may have a bottom retain sensor 32 which is part of the monitoring system and which initiates a signal in the control system when the fuel level in the associated tank reaches a predetermined minimum level.

FIGS. 1 and 3 illustrate a thermistor socket 34 and an optic socket 36 associated with the overfill protection system. Sockets 34 and 36 are subject to wear due to the many fuel loadings inherent in the operation of a tank truck. Socket 34 is shown in detail in FIGS. 17-19.

FIGS. 4-16 show the overfill sensor probe 26 in detail. Referring to FIGS. 4-9, a cylindrical probe housing 40 is provided with a depending, externally threaded ring 42 which, when the probe 26 is installed, is received by the mating threads of an opening (not shown) in the top of a corresponding tank compartment 22 of the tank truck 20. A cylindrical probe tube 44, preferably aluminum, is coaxial with the housing 40 and extends downwardly therefrom as shown, for example, in FIGS. 5-7. A cap 46 is secured to the top of housing 40 and is securely held thereon by four outwardly extending dogs 48, each of which is received in a corresponding J-shaped slot 50 in the cap 46. As may be appreciated from viewing FIGS. 7 and 11, the top, circular rim 56 of the housing 40 is received in a circular recess in cap 46 having a gasket 58 therein which assures a tight fit as the gasket is compressed when the dogs 48 are seated in the slots 50 as seen in FIGS. 5 and 6. As is also apparent in FIG. 7, the upper, circular rim 56 thus compresses the gasket 58 when the cap 46 is secured thereby providing a seal between the probe cap 46 and the housing 40. A tamper screw 54 assures that any effort to remove the cap 46 by unauthorized personnel will be evident.

Figure 11:
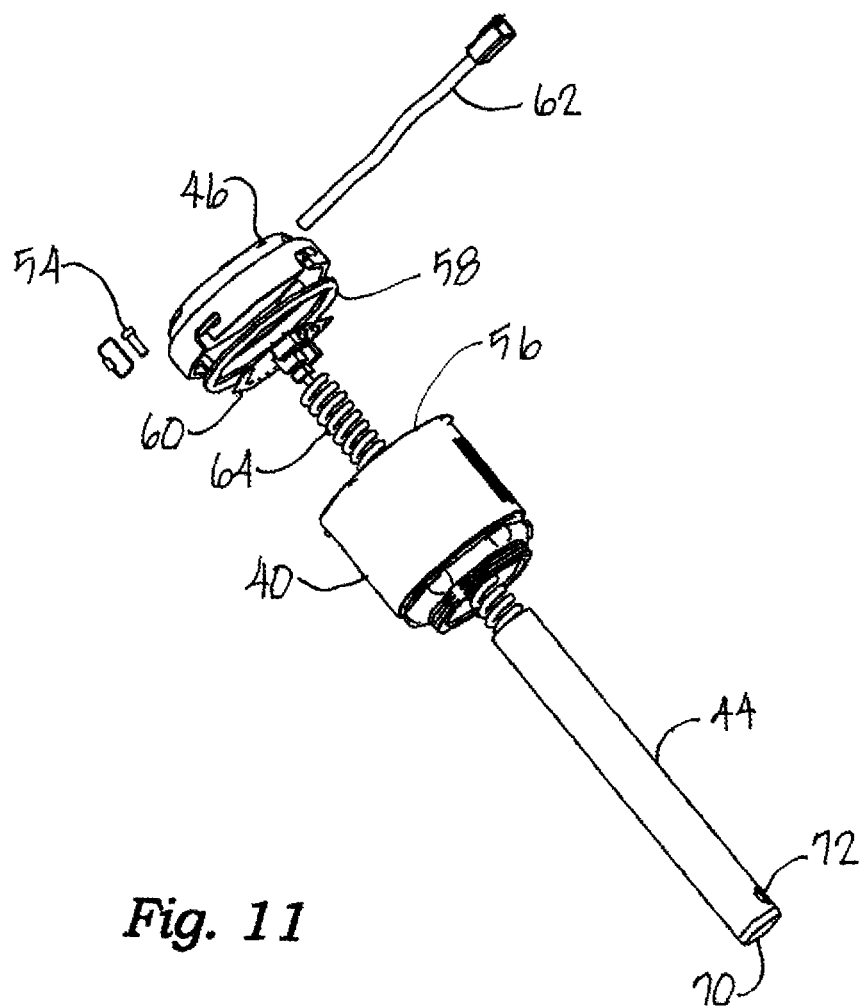
FIG. 11 is an exploded view of the probe assembly showing the circuit board (in the probe cap) and illustrating the expandability of the connecting cable that permits the probe cap to be removed from the housing without damage to components in the probe tube.

As seen in FIG. 7 and the exploded view of FIG. 11, a circuit board 60 is mounted within the cap 46 and provides the necessary electrical components to provide communication between the probe 26 and the on-board monitor 30 to indicate, for example, the status of the associated tank compartment as either filled or underloaded. In this regard, it should be appreciated that the communication system from the tank compartments to the cab 21 is bus-based and thus each of the compartments of the tank 22 may individually communicate with the system either by wire or wireless. A Deutsch connector cable 62 extends from the circuit board 60 of each overfill probe 26 through cap 46 thereof for connection to the common cable 28. When probe circuit board 60 is configured as wired or wireless communication, it may communicate with other probes, on-board monitor, sockets or other tractor cab electronics. These communications may contain status, prior recorded events, history or other value information. In the event of a malfunction, an LED 63 (FIG. 4) beneath the cap 46 is energized and is immediately visible when the cap is removed.

Referring to FIGS. 7 and 11, a curly cord provides an insulated electrical cable 64 having its upper end attached to the probe cap 46; specifically, to a connector 66 on the inside of the cap 46. The lower, opposite end of the cable 64 is anchored to a disk or plate 68 adjacent the lower end 70 of the probe tube 44. Accordingly, any unauthorized tampering with the overfill probe or attempt to remove the cap 60 will not damage the internal components in either the tube 44 or the cap 46, as the cable 64 will simply yield and stretch axially. The probe of the present invention is, therefore, protected against damage to its internal components by the action of unauthorized personnel during the loading process.

Figure 10:
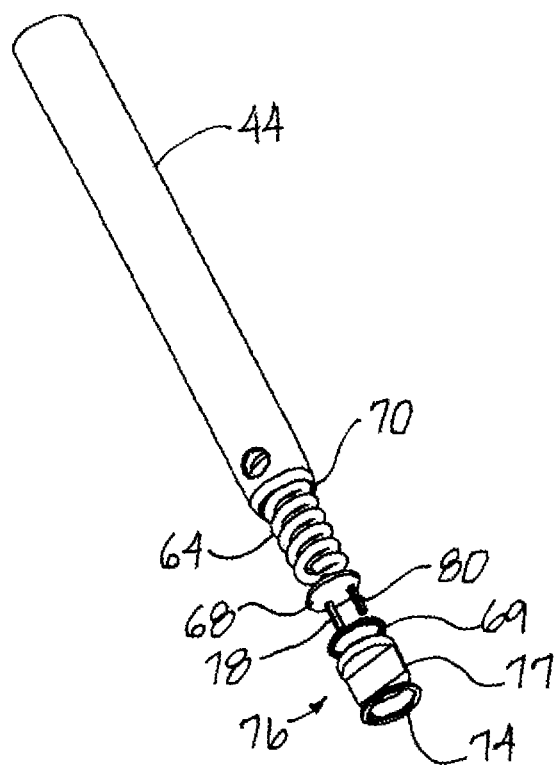
FIG. 10 is a fragmentary, exploded view of the depending probe tube showing the internal components of a level sensor.
Figures 13, 14, 15, 16:
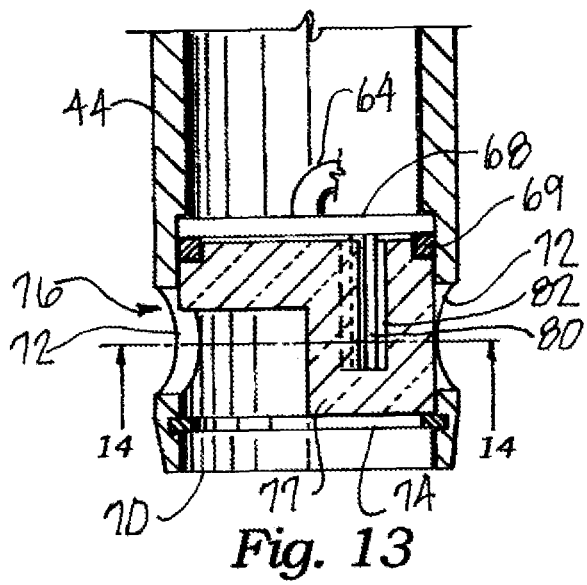
FIG. 13 is an enlarged cross-sectional view of the bottom end of the probe tube.
FIG. 14 is a cross-sectional view taken along line 14-14 in FIG. 13, looking in the direction of the arrows.
FIG. 15 is a detail, bottom view similar to FIG. 14 illustrating the emitter and the detector within the glass head, and showing the signal path when the fuel level is below the bottom end of the probe (dry condition).
FIG. 16 is a view identical to FIG. 15 but showing the light path in the wet condition where the level of the fuel is at the glass head.

The overfill probe 26 has two opposed, circular openings 72 adjacent the lower, open end 70 of the probe tube 44 and thus loaded fuel enters the bottom end of the probe 26 and effects a termination of the loading of fuel into the associated compartment of the tank 22. More particularly, as shown in FIGS. 10, 13 and 14, the exposed lower end 70 contains a level sensor comprising a circuit board 68 and gasket 69, and a snap ring 74 therebelow between which a glass head 76 is mounted. As may be appreciated from a comparison of FIGS. 10, 13 and 14, the glass head 76 has a generally circular upper portion complemental to the circular interior configuration of the probe tube 44, and a semi-circular, downwardly projecting portion 77. An elongated emitter element 78 and an elongated detector element 80 are disposed in an arcuate slot 82 (FIGS. 14-16) in the downwardly projecting portion 77 of the glass head 76. The elements 78 and 80 depend from and are connected to the circuit board 68 which is secured to the lower end of the curly cable 64. Both the emitter and detector elements 78 and 80 extend downwardly into the arcuate slot 82 as may be appreciated from FIGS. 15 and 16. If the bottom end of the probe is above the level of fuel in the tank, the signal from the emitter 80 will be deflected at the flat vertical surface 83 of the glass head 76 and will be received by the detector element 80 as illustrated in FIG. 15, thereby evidencing a dry condition in which the level of the fuel in the tank is below the sensor. However, if the level of the fuel has reached the emitter and detector elements 78 and 80, a wet condition is indicated as shown in FIG. 16 as the signal from the emitter is no longer reflected to the detector 80 as illustrated by the arrows. Accordingly, the circuit board 68 responds to the wet condition with a signal via the curly cable 64 to the circuit board 60 in the cap 46 for transmission via cable 62 to the cable 28 whereby the system responds by terminating the permit signal and fueling of the tank ceases.

Figure 12:
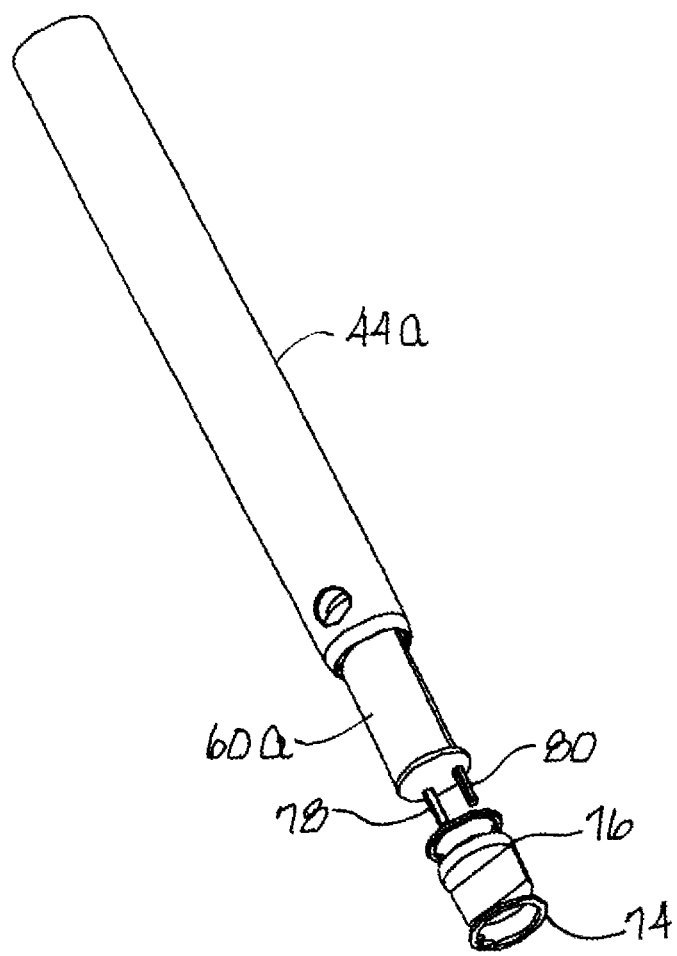
FIG. 12 is a fragmentary, exploded view showing the sensor components housed within the lower end portion of the probe tube, and shows an alternative embodiment in which the circuit board is in the probe tube.

FIG. 12 illustrates an alternative embodiment of the overfill probe in which the circuit board 60 is not mounted within the cap 46 as illustrated in FIG. 7. More particularly, the probe tube 44*a* receives a tubular circuit board 60*a* which is retained inside the tube 44*a* and connected by wiring (not shown) to the cap 46 at a suitable connector within the cap, such as the connector 66 shown in the embodiment of FIG. 7. Accordingly, the curly cord comprising cable 64 in the embodiment of FIG. 7 is not utilized in the modified form of the overfill probe tube assembly shown in FIG. 12. Otherwise, the functionality of the cylindrical probe tube 44*a* is the same as in the embodiment shown in FIG. 10.

The overfill probe 26 of the present invention also facilitates the establishment of the maximum fuel level in the tank as this is controlled by the extent to which the probe tube 44 extends downwardly into the tank. In FIG. 7, the tube 44 is fully inserted into housing 40 through a central opening in the bottom 83 and thus is at maximum height. However, it is held in the position illustrated by a spring clip 84 seen in FIG. 7 and shown in detail in FIG. 8, which is secured to bottom 83 by a fastener 85. By squeezing a pair of legs 86 of the clip 84, the spring tension is momentarily released sufficiently to permit the operator to shift the tube axially from, in the illustrated embodiment, a position of maximum height to a lower level where the emitter and detector elements 78 and 80 are at a lower elevation within the tank and, therefore, define a lower level at which the permit signal will be terminated.

Thermistor and Optic Sockets

The thermistor socket 34 and the optic socket 36 are of essentially the same construction, the difference between the two sockets being the number of contact screws presented. As shown in FIG. 3, the thermistor socket 34 presents a total of ten screw heads, whereas the optic socket 36 presents six screw heads. The thermistor socket 34 is shown in detail in FIGS. 17-19, it being understood that the internal construction of the optic socket 36 is the same except for the lesser number of contact screws. This design allows for combinations of screw heads other than the primary six or ten.

Figure 17:
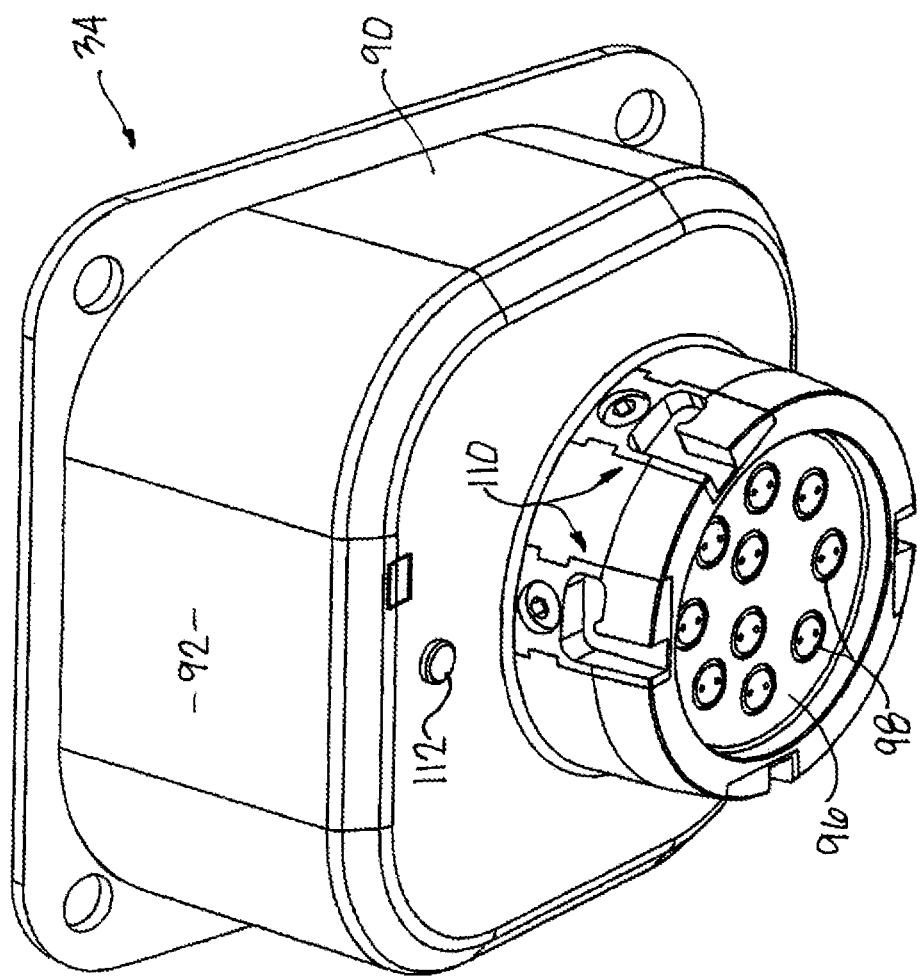
FIG. 17 is a perspective view of a thermistor socket.
Figure 18:
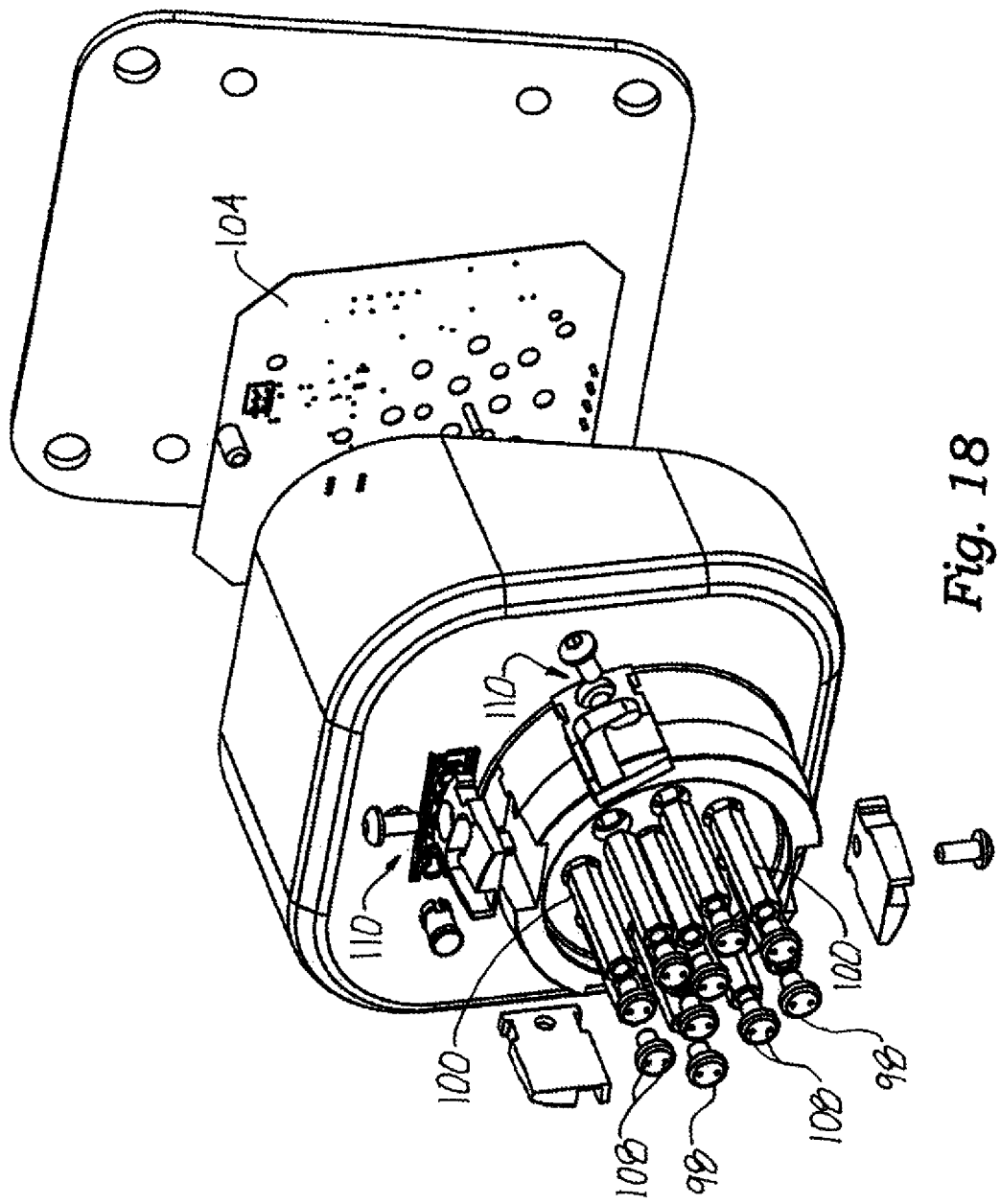
FIG. 18 is an exploded view of the thermistor socket of FIG. 17.
Figure 19:
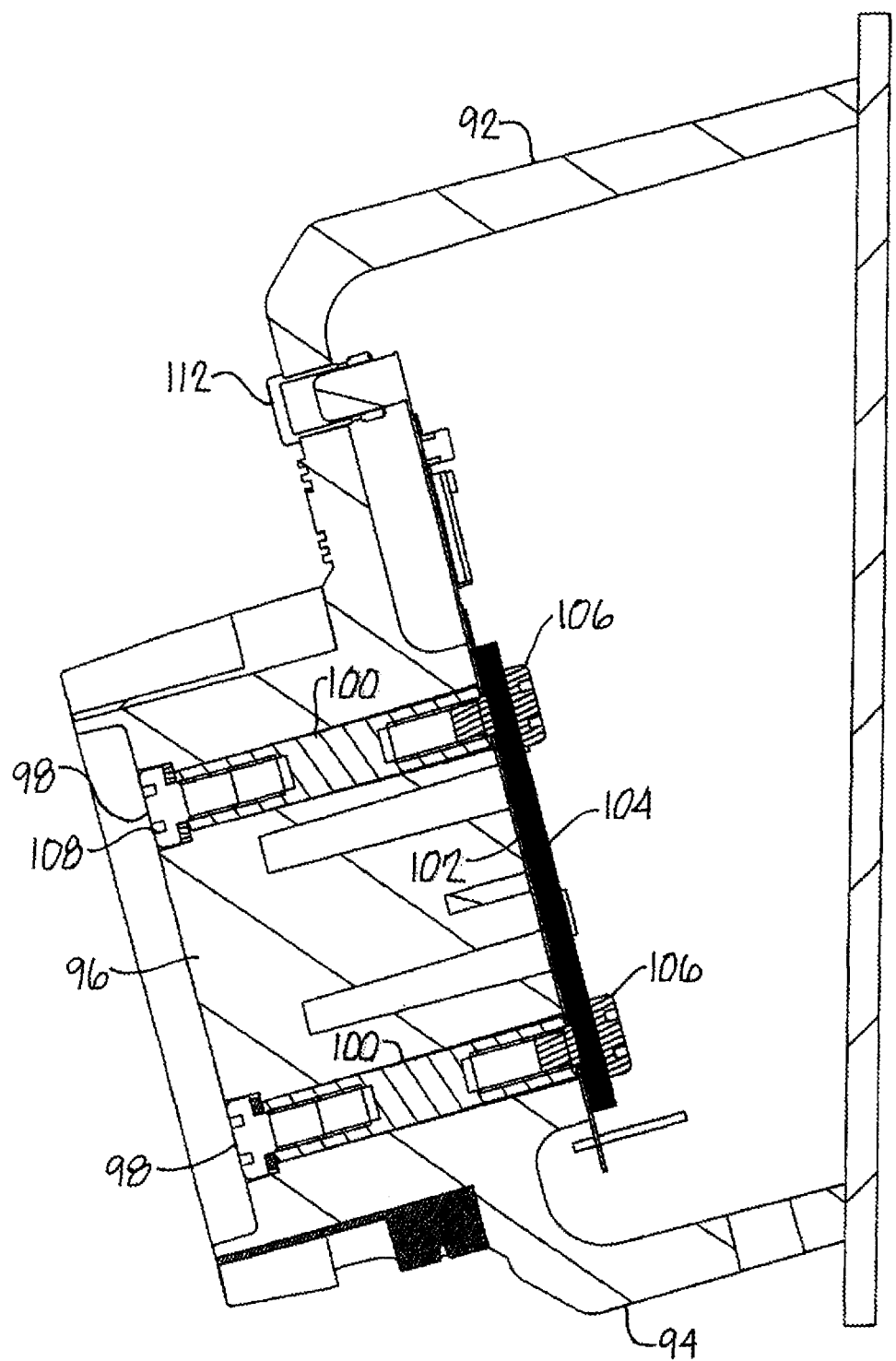
FIG. 19 is vertical cross-sectional view of the socket of FIG. 17 showing internal components including two of the contact pins.

Referring to FIGS. 17-19, the thermistor socket 34 has a housing 90 of essentially square configuration and presents a top surface 92 having a greater front to rear length than the bottom surface 94 of the housing, and thus the socket 34 is tilted downwardly at an angle of approximately thirty degrees from vertical. This minimizes the entry of moisture into the socket as it is typically mounted on the tank 22 and thus exposed to the elements. The socket 34 presents a circular, recessed face 96 where the heads of the contact screws 98 are exposed. Each screw 98 is relatively short and is received in a corresponding standoff 100 secured to a mounting plate 102 (FIG. 19) to which a printed circuit board 104 is mounted and held by internal screws 106.

FIG. 18 is an exploded view showing the contact screws 98 and corresponding standoffs 100. The contact screws 98 are subject to heavy abuse requiring that repairs be made in the field. This is facilitated in the present invention as the contact screws 98 are separate from the standoffs 100 into which they are threaded. Each of the contact screws has a pair of spaced recesses 108 in the head thereof for receiving a screwdriver tip (not shown) presenting two male prongs that are inserted into the openings 108 so that a worn or otherwise defective screw 98 may be quickly replaced. Accordingly, in the present invention repairs are made in the field by simply replacing a worn screw 98 without the need to also replace the associated standoff 100 or other components.

The socket 34 is also provided with four J-slot locks 110 spaced around the socket for receiving a plug (not shown) on the end of a cable that extends from a loading island in the conventional manner.

It should be appreciated that in the sockets of the present invention, electronic circuit board 104 allows communication to occur between sockets, on-board monitors and other probes. During operation, status LED 112 (FIGS. 17 and 19) shows the user different varieties of conditions (status) including, but not limited to, probe status, probe diagnostics, and pass/fail conditions when connected to the loading rack. The circuit board 104 also contains internal ground verification circuitry which not only precludes the need for a separate ground bolt, but can also report the quality of the ground verification connection to the vehicle and the rest of the system.

It is to be understood that while certain forms of this invention have been illustrated and described, the invention is not limited thereto except insofar as such limitations are included in the following claims.

Having thus described the invention, what is claimed as new and desired to be secured by Letters Patent is as follows:

1. In a fuel delivery system of a transport truck having a fuel storage compartment, an overfill sensor probe for terminating a permit signal to cease the refueling of the compartment comprising:
   a housing having a probe tube extending therefrom and adapted to be secured to an upper portion of said compartment with said probe tube extending downwardly into said compartment and presenting a lower end for receiving fuel therein when the fuel rises above a predetermined level,
   said probe tube having a level sensor therein disposed within said lower end above said predetermined level and responsive to a maximum permitted level of fuel in said compartment for producing an output signal,
   a control responsive to said output signal for terminating said permit signal to thereby cease the refueling of the compartment, and
   a fuel level monitor adapted to be disposed on said transport truck, said housing having a removable cap and electrical components mounted in said cap to provide communication between said probe and said monitor, and a longitudinally expansible and retractable electrical cable in said probe tube interconnecting said level sensor and said electrical components to preclude internal damage if the cap is removed from the housing.

2. The overfill sensor probe as claimed in claim 1, wherein said lower end of the probe tube has an opening for entry of fuel in to the probe tube when the fuel rises thereto, said level sensor being disposed above said opening and responsive to said maximum permitted level of fuel for initiating said output signal.

3. The overfill sensor probe as claimed in claim 2, wherein said level sensor comprises a transparent head having spaced emitter and detector elements therein and presenting a surface which normally reflects a signal from said emitter element to said detector element indicative of a fuel level below said maximum permitted level and, in a wet condition indicative of the presence of a maximum permitted fuel level, ceases to reflect said signal, said control being responsive to absence of said signal for terminating the permit signal to cease refueling the compartment.

4. The overfill sensor probe as claimed in claim 1, wherein said electrical cable comprises a curly cord.

5. The overfill sensor probe as claimed in claim 1, wherein said electrical components comprise a circuit board.

6. The overfill sensor probe as claimed in claim 1, further comprising a fuel level monitor adapted to be disposed on said transport truck, said housing having a removable cap and electrical components retained within said tube to provide communication between said probe and said monitor.

7. The overfill sensor probe as claimed in claim 1, wherein said housing has adjustable means therein engaging said tube to maintain said lower end thereof at a selected height corresponding to said predetermined level.

8. The overfill sensor probe as claimed in claim 7, wherein said adjustable means comprises a spring clip mounted in said housing and engaging said tube.

9. The overfill sensor probe as claimed in claim 1, wherein said housing has a cap thereon and is provided with a plurality of outwardly extending, spaced dogs, said cap having a plurality of spaced slots therein configured to receive corresponding dogs and releasably secure the cap on the housing.

10. The overfill sensor probe as claimed in claim 9, wherein each of said slots is J-shaped.

\* \* \* \* \*